United States Patent [19]

Baader

[11] Patent Number: 5,348,460
[45] Date of Patent: Sep. 20, 1994

[54] APPARATUS FOR PRODUCING FLAT PLASTIC MOLDINGS, FOR EXAMPLE IDENTITY CARDS

[75] Inventor: Helmut Baader, Nabburg, Fed. Rep. of Germany

[73] Assignee: GAO Gesellschaft fur Automation and Organisation mbH, Munich, Fed. Rep. of Germany

[21] Appl. No.: 992,727

[22] Filed: Dec. 18, 1992

[30] Foreign Application Priority Data

Dec. 20, 1991 [DE] Fed. Rep. of Germany ....... 4142410

[51] Int. Cl.$^5$ ............... B29C 45/14; B29C 45/33; B29C 45/36
[52] U.S. Cl. .................. 425/121; 425/122; 425/126.1; 425/127; 425/553; 425/577; 425/588; 264/272.11
[58] Field of Search .............. 425/577, 588, 126.1, 425/553, 121, 127, 122; 264/272.11

[56] References Cited

U.S. PATENT DOCUMENTS

| | | | |
|---|---|---|---|
| 2,526,877 | 10/1950 | Jurgeleit | 425/588 |
| 4,466,787 | 8/1984 | Ragir et al. | 425/553 |
| 4,701,236 | 10/1987 | Vieilledent | 156/252 |
| 4,820,149 | 4/1989 | Hatakeyama et al. | 425/588 |
| 4,856,977 | 8/1989 | Von Holdt | 425/577 |
| 4,867,672 | 5/1989 | Sorensen | 425/577 |
| 4,986,942 | 1/1991 | Irgens et al. | 425/577 |
| 5,030,309 | 7/1991 | Brighet et al. | 156/245 |
| 5,174,941 | 12/1992 | Sorensen | 425/577 |
| 5,188,787 | 2/1993 | King et al. | 425/553 |

FOREIGN PATENT DOCUMENTS

| | | |
|---|---|---|
| 0456323 | 11/1991 | European Pat. Off. . |
| 1210977 | 5/1961 | Fed. Rep. of Germany . |
| 59-159308A | 9/1984 | Japan . |
| 980617 | 1/1965 | United Kingdom . |

Primary Examiner—Khanh Nguyen
Attorney, Agent, or Firm—Bacon & Thomas

[57] ABSTRACT

In an apparatus for producing flat plastic moldings, for example identity cards, the mold includes a conic core and a die-block member shaped in accordance with the core member. The opposing side surfaces of the core and die-block members, which are inclined to the opening direction of the mold, enclose a mold space on part of their surface. The core and die-block members are formed in such a way that the mold parts brace each other in the closed state.

8 Claims, 2 Drawing Sheets

APPARATUS FOR PRODUCING FLAT PLASTIC MOLDINGS, FOR EXAMPLE IDENTITY CARDS

FIELD OF THE INVENTION

The present invention relates to an apparatus for producing flat plastic moldings, and to an identity card produced with this apparatus.

BACKGROUND OF THE INVENTION

The use of injection molding apparatus for producing identity cards has become known, especially in connection with the production of so-called chip cards, An apparatus known from European Patent Application No. EP-A10 267 826 is provided with two mold parts movable relative to each other and enclosing a cavity corresponding to the configuration of the card. The known apparatus produces card bodies with a recess in which a so called module, generally comprising a carrier film with an integrated module and contact surfaces, can be inserted. Such modules disposed on a carrier film are known, for example, from European Patent Application No. EP-A2 0 268 830. In the known apparatus the recess is produced by a core or die protruding into the mold space and corresponding to the contour of the recess. To produce the card one injects molten plastic into the mold space at very high pressure via a nozzle or opening in one mold part. The mold parts must thereby be pressed together such that no plastic penetrates between them. Such over-injection not only leads to a mold mark on the molding but also damages the tool in most cases.

The necessary locking pressure is applied by a so called closing unit (not shown in the aforementioned application EP-A1) which is also used to open and close the tool. The closing unit generally comprises a hydraulically operated knee lever connected at one end with one mold part and at the other end with a strut of the injection molding machine. With the tool structure known from the EP-A1, such a closing unit would be loaded to a particularly high degree since almost the total area of the mold space is perpendicular to the opening direction of the mold. The force acting on the closing unit is calculated from the injection pressure prevailing in the mold space multiplied by the area of the mold space acting perpendicular to the opening direction, which in this case corresponds to the area of the identity card to be produced. At an injection pressure of about 1000 bars, a closing unit must apply a locking pressure of about 500,000 to 600,000 newtons per card to ensure reliable operation. Closing means with high locking pressures involve an accordingly elaborate design of the injection molding machine and necessarily also increase the machine costs, which ultimately affect the price of the product.

In the known apparatus, the injection opening is located opposite the die producing the recess. This assembly results in a gate mark on the surface of the card which is undesirable in many cases. This can be avoided by shifting the injection opening to the side edge of the mold space, as is known. But this causes the problem that the injected plastic material cannot be optimally distributed mainly behind the die, regarded from the injection opening. This results in quality losses such as joint lines or inclusions of air. Since the cards are sometimes exposed to very strong bending stresses in use, such irregularities in the distribution of material make the card break after a relatively short life.

SUMMARY OF THE INVENTION

An objective of the invention is to provide an apparatus for producing flat moldings, in particular identity cards, that permits inexpensive production of identity cards. It should also improve the life of the cards.

This objective is met by providing an apparatus having two mold parts that are movable relative to each other and enclose at least one mold space, with closing means whose locking pressure acts against the opening direction of the mold parts. In particular, the invention has a core member with inclined mold faces and a complementally shaped die-block member arranged so that the opposing side surfaces of the core member and die-block member are inclined to the opening direction of the mold parts and enclose at least one approximately two-dimensional mold space on part of their surface, with the core and die-block members formed to brace each other in their closed state.

An essential feature of the inventive solution is that the mold space, which is predominantly of two-dimensional design for producing cards, is not disposed in the obvious position perpendicular to the opening direction of the mold parts but instead is inclined to the opening direction. This permits the holding power required for keeping the mold closed to be reduced to the force resulting according to the parallelogram of forces from the area projected perpendicular to the opening direction. The force arising parallel to the opening direction can be absorbed, when the mold is closed, by the mutual bracing of the mold parts and by corresponding wall thicknesses of the mold. Most of the locking pressure is thus absorbed by the tool itself, i.e. by the mold parts. The closing means need only apply a relatively small part of the locking pressure and can be of accordingly smaller dimensions. This is of special interest for so-called multicopy tools used for injecting a multiplicity of identity cards simultaneously. Despite the surface force in this case multiplied in accordance with the number of cards, the tool can be used in an injection molding machine of smaller design due to the reduced locking pressure, which directly affects the machine costs and thus also the price per piece of the produced cards.

The design of mold parts such that they brace each other in the closed state is basically known. However such tools were always used up to now for producing three-dimensional hollow bodies or for producing bodies with outer undercuts. Despite the evident advantages, an apparatus according to the invention was hitherto not proposed for producing simple flat bodies. The reason for this may be that an accordingly simple standard tool was hitherto always used due to the simplicity of the molding to be produced, as known for example from the European application EP-A1.

In the inventive apparatus, a mold space is provided on each inclined side surface of the core member so that in even the simplest embodiment of the apparatus, two identity cards can be produced in each operation. The angle of inclination to the opening direction determines the necessary opening stroke of the tool for removing the cards, on the one hand, and the proportion of locking pressure acting on the closing unit, on the other hand. The angle of inclination can fundamentally be varied within wide limits since it is not determined by the shape of the mold part. Assuming a certain number of mold spaces, one will preferably adjust the angle of inclination such that the tool can be used in an injection molding machine designed as small as possible, i.e. a machine with a low locking pressure, in order to minimize machine costs. The economy of production is ultimately defined essentially by the number of mold spaces and the size of the injection molding machine.

According to a development of the invention, at least one die movable between a first and a second position into and out of the mold area is provided in the core member of the tool. According to this development, the plastic material is first injected into an initial mold space whose configuration corresponds substantially to that of the molding but without the die being introduced yet. Since no reductions of area obstructing the flow path exist in this initial state of the mold space there are no problems filling the mold space with the plastic material. At a certain time during the injection process the die is pressed into the mold space to produce a recess suitable for embedding a module, whereby the plastic material is pressed back into the mold in the area of the die. The apparatus according to the development can produce identity cards with recesses that have a uniform molecular orientation even in the area of the recess. The cards have a clearly longer life even when exposed to strong bending stresses in use.

According to a further embodiment of the invention, the die movable into the mold space is utilized to stamp modules out of a carrier band carrying individual modules through the core member and to press each stamped out module into the plastic material during the injection process in such a way that the surface of the module is flush with the card surface. With this procedure the module can already be inserted into the card body during card production, which permits a particularly economical method for producing identity cards with integrated circuits produced by injection technology.

BRIEF DESCRIPTION OF THE DRAWINGS

Further embodiments and advantages of the invention will become apparent from the following detailed description and the accompanying drawings, wherein like reference characters designate like parts throughout the several views, and wherein.

BEST MODE FOR CARRYING OUT THE INVENTION

Figure 1:
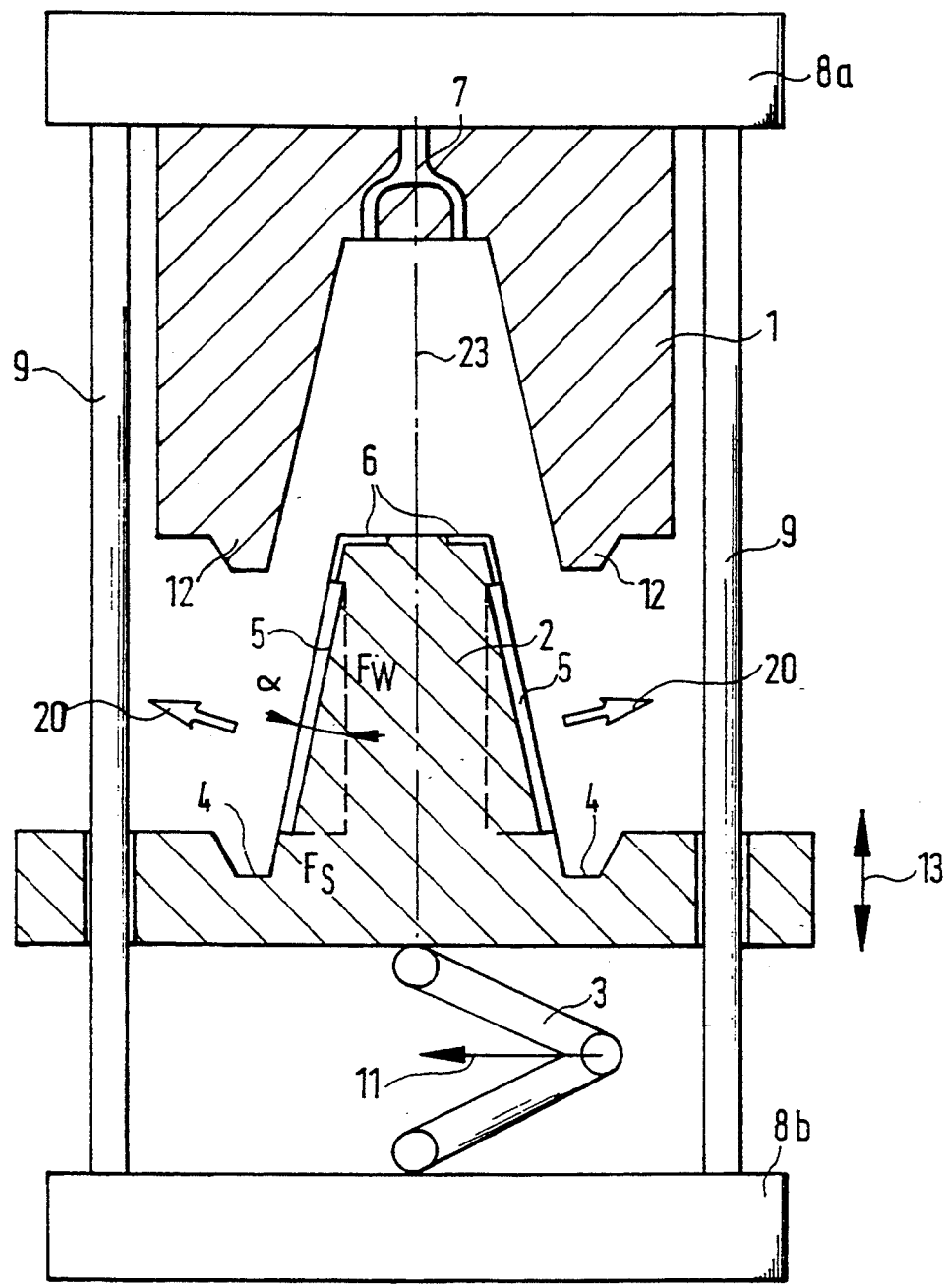
FIG. 1 is a schematic transverse sectional view of an embodiment of the invention.

FIG. 1 shows very schematically an injection molding tool according to the invention. The tool comprises a core member 2 having the shape of a trapezoid in transverse cross-section, and a die-block member 1 adapted to the core. The die-block member, in which gate 7 is located, is fastened to a strut 8a of the closing unit. The core member is connected with a further strut 8b of the closing unit via a so-called knee lever 3. Struts 8a, 8b are firmly screwed together via guide rods 9 and also serve to guide the core member during the opening and closing of the mold.

On each side surface of the core member there is a mold space 5 adapted to the configuration of the card to be molded, each mold space communicating with an injection channel 6 that is brought together with gate 7 of the die-block member when the mold is closed. Details of the gate system are not the object of the invention so that no further explanations of this are required here.

When knee lever 3 moves in the direction of arrow 11 the core member is brought together with the die-block member and the mold closed. The opening and closing direction is marked by arrow 13. In the closed state, projections 12 in the die-block member positively engage depressions 4 in the core member shaped in accordance with the projections, resulting in a mutual bracing of the mold parts. When molten plastic compound is pressed into mold spaces 5 via gate 7 and adjacent connecting-channels 6, most of the locking pressure is absorbed by the tool itself, i.e. by the mutually braced mold parts. In accordance with the angle of inclination $\alpha$ or the inclination of the mold space plane to opening direction 13 (bisecting line 23) one can adjust the ratio of forces acting on the locking means (knee lever 3) and the mold itself (perpendicular to bisecting line 23). The ratio of forces corresponds to that of projected areas $F_s$ and $F_w$. In the present example, this ratio of forces is about 4:1, i.e. the mold absorbs about 80% of the forces arising during the injection process.

The distribution of locking pressures is thus predominantly dependent on the angle of inclination $\alpha$ in the case of two-dimensional moldings. However, the angle of inclination $\alpha$ also determines the opening stroke of the tool for removal of the finished moldings, which, in the embodiment shown in FIG. 1, is performed in the direction of arrows 2.0 by a removing means not shown in the Figure. While the component of force acting on the closing unit grows as angle $\alpha$ increases, the opening stroke of the tool can be made accordingly smaller. Angle of inclination $\alpha = 0$ would thus be ideal in principle since almost no force would act on the locking means in this case. But this angle is unsuitable since the mold would be almost impossible to open after injection due to the persistent surface friction. At angle $\alpha = 90°$ the total surface force acts on the locking means.

When dimensioning, one will expediently select an angle between these extremes. Additionally considering the maximum acceptable stroke of core member I and the available locking pressure of an injection molding machine selected for the particular application, one can fix the angle of inclination in accordance with these two further parameters.

Figure 2:
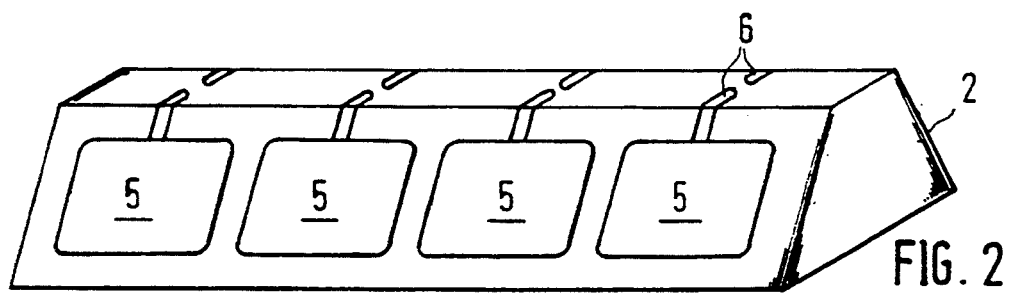
FIG. 2 is a top perspective view of the core member of the apparatus, with a multicopy assembly.

FIG. 2 shows a core member with two sets or rows of four mold spaces 5, each having a connecting channel 6 to link up with gate 7 in the die-block member. The inventive apparatus can be used particularly advantageously for multicopy assemblies as shown in FIG. 2, since injection molding machines of smaller design can be used despite the necessary multiplied locking pressure.

When the identity card produced with the apparatus in FIG. 1 is to be equipped with a so-called chip module, a recess adapted to the chip module must be provided in the card after production. Such a recess can also be incorporated in the card during the injection process. A suitable apparatus for this purpose is shown in FIG. 3.

Figure 3:
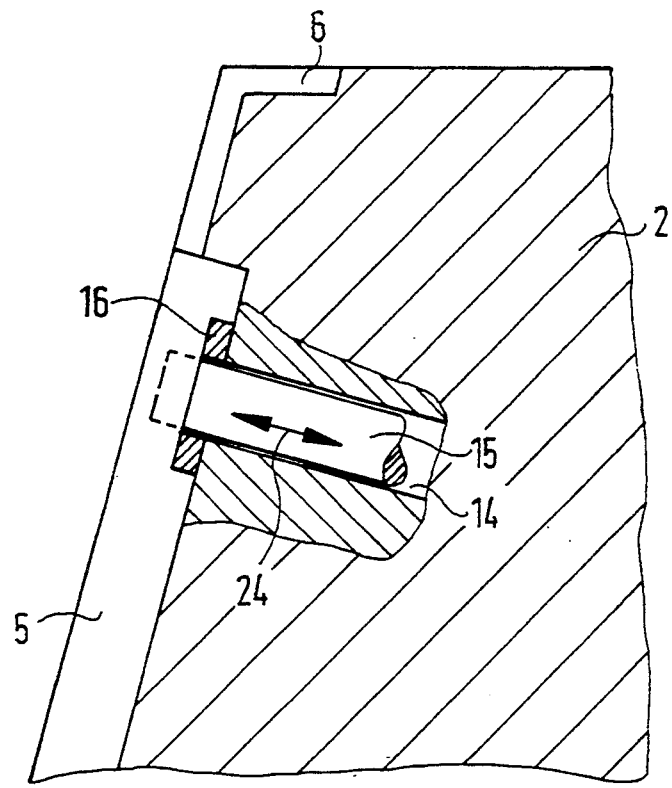
FIG. 3 is an enlarged fragmentary sectional view showing a detail of the apparatus in the area of a mold space with a movable die.

FIG. 3 shows, in a development of the invention, a detail of core member 2 in the area of mold space 5. To produce a two-step recess in an identity card produced by injection molding, a core member 16 firmly mounted in the mold space and a die 15 movable in a guide means 14 in the direction of arrow 24 are provided. Element 16 firmly mounted in the mold space produces a first step of the desired recess in the card. To produce the second step of the recess, die 15 is movable relative to core member 2 between a first and a second position. In the first position, in which the face of the die does not protrude into mold space 5, the injected plastic material can spread within the mold space with little hindrance since there are no reductions of area obstructing the flow path. At a certain time during the injection process, the die is moved into the mold space to the position shown in the figure by broken lines, thereby displacing the plastic material in the area of the die up to a residual wall thickness. The time for moving the die into the mold space should be selected such that the volume of material displaced by its introduction can be taken up by a not yet completely filled mold space or by other compensating spaces.

As an alternative to the shape of the die shown in FIG. 3 the step formed by element 16 (mold space projection) and die 15 can also be produced by corresponding stepping in the face of the die. In this case there are no obstacles at all in the mold space during the first injection phase. In the second phase both steps are then pressed in by means of the die.

The development of the invention shown in FIG. 3 can produce identity cards with a two-step recess. In such a recess one can glue, for example, the module known from EP-A2 0 268 830. The cards also have a uniform molecular orientation in the area of the recess and therefore have a clearly longer life even when exposed to strong bending stresses in daily use.

Figure 4:
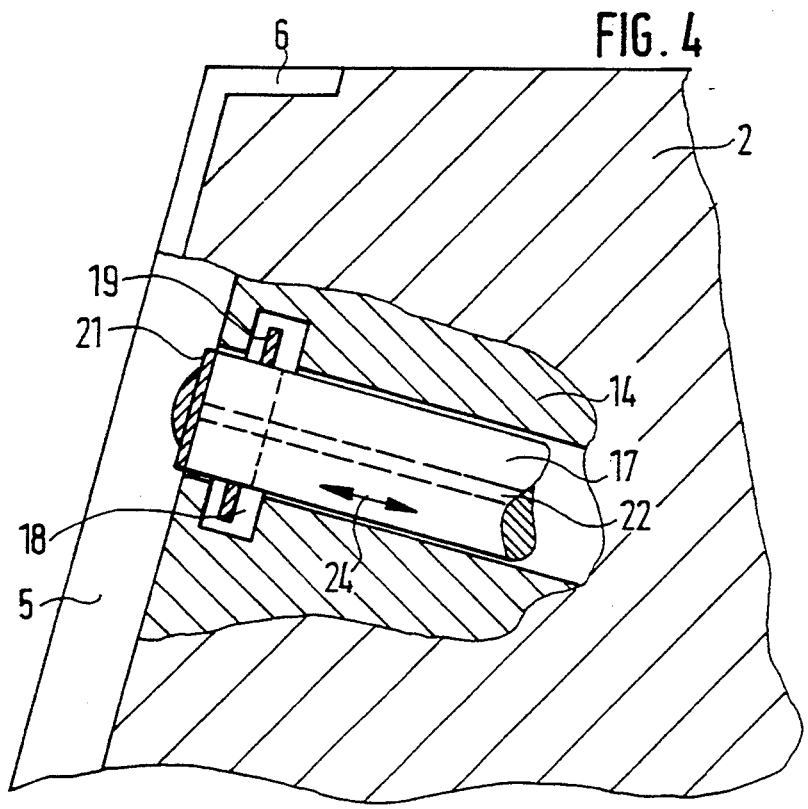
FIG. 4 is a view similar to FIG. 3, showing a detail of the apparatus in the area of the mold space with a die for stamping out modules.

FIG. 4 shows a further embodiment of the invention that utilizes a die 17 movable into mold space 5 in a guide means 14 to produce an identity card with an already embedded IC module in one operation. In this embodiment, movable die 17 is utilized to stamp modules out of a carrier band 19 bearing a row of IC modules and to press the stamped out module into the not-yet-solidified injecting molding compound. Carrier band 19 with the IC modules is guided through a transport channel in core member 2 perpendicular to the die motion and positioned correctly in each case.

In a first step, carrier band 19 is disposed before the face of die 17 shown by broken lines in FIG. 4 in such a way that an IC module is stamped in the correct position. Lowering die 17 toward mold space 5 (arrow 24) causes the IC module to be stamped out of carrier band 19. The stamped out IC module can be held against the face of the die by a suction channel 22. Die 17 is now shifted toward mold space 5 until the lower edge of the chip module is substantially flush with the upper edge of mold space 5, i.e. the IC module does not yet protrude into the mold space. In this position, the plastic material is injected via injection channel 6. When the mold space is sufficiently filled, the die, together with the IC module, is pressed into the plastic compound until the plane face of die 17 is flush with the later card surface. The cards produced with an apparatus according to FIG. 4 are also characterized by a uniform molecular orientation involving a clearly improved life.

What is claimed is:

1. An apparatus for producing flat plastic cards with an integrated circuit embedded therein, comprising:
   two mold parts that are supported for movement relative to each other and which enclose between them at least one mold space;
   a closing means connected with the mold parts to close them toward one another with a locking pressure which acts against the opening direction of the mold parts;
   said mold parts including a wedge-shaped core member having mold surfaces inclined to the direction of opening movement of the mold parts, and a die-block member shaped complementally to the core member and having surfaces respectively opposed to the mold surfaces on the core member so as to define at least two approximately two-dimensional mold spaces on respective sides of said core member when the mold is closed;
   interfitting means on the core member and die-block member which engage one another when the mold is closed, whereby the core member and die-block member brace each other when the mold is closed; and
   means providing for an integrated circuit module to be embedded into a flat plastic card produced by said apparatus, said providing means including a movable element provided in said core member for each of said mold spaces, each of said movable elements being shiftable substantially perpendicular to a respective side of said core member to a position within a respective one of said mold spaces so as to control the volume of the mold space.

2. The apparatus as claimed in claim 1 wherein:
   each of the mold spaces is formed by a recess in the mold surface of the core member, said recess having a configuration corresponding to the shape to be given to the card.

3. An apparatus according to claim 1, further comprising:
   means for delivering a supply of plastic to said mold spaces; and
   means for supplying an integrated circuit module into each of said mold spaces, said supplying means including said movable element which is adapted to engage an integrated circuit and shift the integrated circuit into a respective one of said mold spaces commensurate with the supplying of plastic by said delivering means.

4. An apparatus according to claim 1, further comprising:
   means for delivering a supply of plastic to said mold spaces; and
   means for shifting each of said movable elements into a respective one of said mold spaces commensurate with the supply of plastic thereto by said delivery means such that recesses are formed in the cards produced by said apparatus with each of said recesses being adapted to receive an integrated circuit.

5. An apparatus according to claim 1, wherein each of said movable elements comprises a stamping die, said apparatus further comprising a band carrying a plurality of integrated circuit modules, said band being guided through said core member between said mold space and said stamping die, whereby when said movable element is shifted, an integrated circuit is separated from said band and transferred into said mold space by engagement with said movable element.

6. An apparatus according to claim 5, wherein said stamping die includes a front face, the shape of which corresponds to the shape of the integrated circuit module.

7. An apparatus according to claim 1, wherein the movable element comprises a movable die adapted to be shifted into the mold space such that a recess is formed in each card produced by said apparatus.

8. An apparatus according to claim 6, wherein the front face of said movable die is stepped such that said recess is formed stepped.

* * * * *